Oct. 26, 1948.   E. GRAVENHORST ET AL   2,452,369
SELF-BLEEDING HYDRAULIC CYLINDER
Filed July 12, 1946

*INVENTOR.*
EVERETT GRAVENHORST
RAYMOND E. VAUGHN
BY
*Donald W. Farrington*
ATTORNEY Patented Oct. 26, 1948

2,452,369

UNITED STATES PATENT OFFICE 2,452,369

SELF-BLEEDING HYDRAULIC CYLINDER

Everett Gravenhorst and Raymond E. Vaughn, Middle River, Md., assignor to The Glenn L. Martin Company, Middle River, Md., a corporation of Maryland Application July 12, 1946, Serial No. 683,266

4 Claims. (Cl. 121—38)

This invention relates to an improvement in hydraulic systems, and more particularly to a self-bleeding piston for a cylinder for use in hydraulic systems.

In hydraulic systems, including power cylinders, in order to secure positive action of the component parts of the system, all air must be bled from the system. It is almost impossible, in filling any hydraulic system, not to introduce air. The air will accumulate in the hydraulic cylinders and upset the normal, smooth function and positive action of the hydraulic system. When the hydraulic cylinders in the system are mounted in a horizontal position the air, which ordinarily accumulates in the cylinders, can be removed through bleed plugs on each end of the cylinder. The horizontal mounting of a hydraulic cylinder, particularly in the hydraulic system of an aircraft, is the exception rather than the rule. In most installations where hydraulic systems are employed, the hydraulic cylinder produces force and is used to move associated parts and usually extends at some time, or at all times, at an angle to the horizontal. Under this condition, air can be bled from the top bleed plug, but the accumulated air on the lower side of the piston in the cylinder forms a pocket under the piston and cannot be readily removed.

The principal object of this invention is the provision of a structure in the piston of a cylinder inclined at an angle to the horizontal which permits the ready removal of accumulated air from the hydraulic cylinder.

Further and other objects will become apparent from the description of the accompanying drawing which forms a part of this disclosure and in which like numerals refer to like parts.

Figure 1:
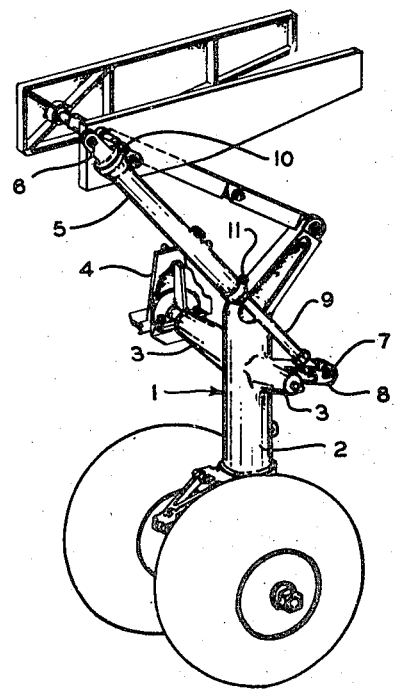
Figure 1 shows a typical landing gear and retracting cylinder therefor.

The landing gear of Figure 1 generally indicated as 1 has the main oleo strut 2 pivoted to turn on trunnions 3 in brackets 4 secured to an aircraft structure. This landing gear is retracted within a fuselage structure by pivoting it about the axis of the trunnion until the wheels and strut come within the fuselage structure. This is accomplished by hydraulic cylinder 5 extending between an upper support or pivot 6 and the lower pivot point 7 on the end of lever 8. Hydraulic cylinder 5 is a double acting hydraulic cylinder. When fluid pressure is introduced into the upper end, strut 9 is extended to lower the landing gear, and when fluid is introduced into the lower end of the cylinder, strut 9 will be retracted and the landing gear pivoted into a position within the fuselage. This installation is a typical hydraulic installation in an aircraft. There are many operative parts of the airplane similar to the above installation where great force and positive action of the part is necessary for the proper performance of the aircraft. The flaps and other moving elements which are hydraulically operated have similar hydraulic cylinders and, as described above, positive, forceful action of the cylinder cannot be achieved unless the hydraulic system is bled of any residual air. Residual air in the hydraulic system will accumulate in the hydraulic cylinder. If the cylinder is mounted in a horizontal position, the system may be bled at the cylinders by bleed plugs 10 and 11. In most installations, the hydraulic cylinders are not mounted in a horizontal position. Due to the fact that the strut usually moves through an arc to operate the mechanism to which it is attached, the cylinder resides at some angle inclined to the horizontal. It is in installations where the cylinder is inclined to the horizontal, that the piston of this invention is important.

It can readily be seen from a consideration of the inclined cylinder shown in the drawing that the residual air in the system will accumulate in two places in the cylinder. One will be adjacent the head on the upper end of the cylinder. This air can easily be removed through bleed plug 10. The other place will be on the under side of the piston as shown at 12 in Figure 2. The removal of this air has always presented a problem.

Figure 2:
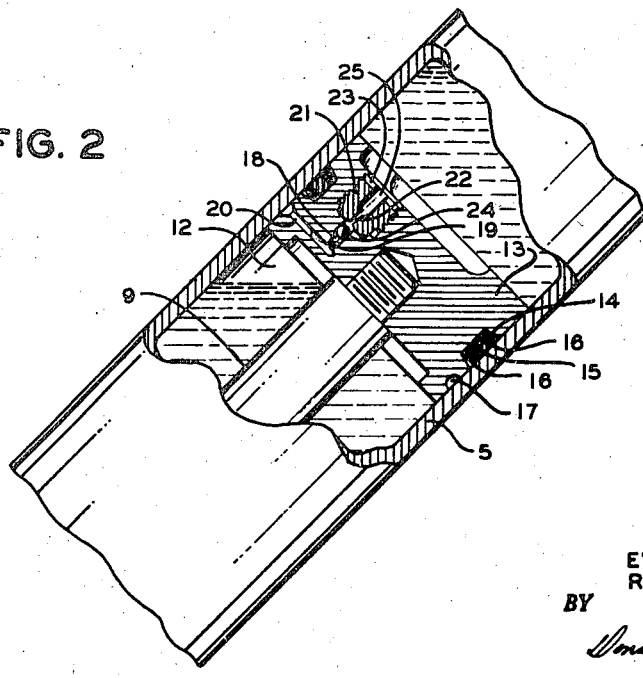
Figure 2 is a fragmentary view of the cylinder and piston in section.

By the self-bleeding piston shown in Figure 2, an inclined cylinder can be adequately bled from the upper bleed plug 10. Piston 13 is shown in cylinder 5 having an annular groove 14 in which is placed an O-ring, rubber or synthetic rubber, seal 15 between annular gaskets 16 of leather, fibre or other tough materials.

This sealing structure in the groove forms the primary fluid pressure seal for the normal operation of the piston. A smaller annular groove 17 surrounds the periphery of the piston and is located generally close to the lower side of the piston. In any event, it must be between the normal piston fluid sealing means and the lower side of the piston. A chamber 18 is formed within the piston. The lower end of the chamber is in communication with groove 17 by a passage formed by bores 19 and 20. The other end of chamber 18 is closed by a plug 21. The end of the plug has a bore 22 of smaller diameter than the chamber, the end of which toward chamber 18 is formed with a valve seat. A similar valve seat is formed on the end of passage 19 opening into chamber 18 for ball 24. Plug 21 threadedly engages piston 13. Screw-driver slot 23 at the end of the plug facilitates its insertion and removal. A ball 24 is placed in the chamber. This ball is of a lesser diameter than chamber 18 so that it will move freely within the chamber. Bore 25 extends through the plug forming with bore 22 a complete passage through the plug.

When the residual air in the hydraulic system accumulates in the cylinder, it will do so in a space such as 12. As the piston is moved back and forth in the cylinder, this air passes between the piston and cylinder wall but cannot, of course, pass the piston fluid seal 16. The air, therefore, will accumulate in groove 17 and flow through passages 20 and 19 to chamber 18. The air will flow through chamber 18 past the ball 24 because of the clearance provided between the ball and the chamber wall, and through passages 22 and 25 and escape to the top of the cylinder where it may be removed by bleed plug 10. As soon as all the air has passed from the lower face of the piston to the upper face of the piston and oil attempts to follow the air, the oil flow will carry the ball to the port in the end of passage 22. There the ball will seat and be held in place by the accumulated fluid pressure behind it and prevent any loss in pressure from the under side of the piston. When reverse action of the piston takes place, the ball will seat at the opposite end of chamber 18 and prevent any loss of fluid pressure.

It should be pointed out that all of the air will be removed from the cylinder, for any position of the cylinder about its longitudinal axis, as the air will seep between the piston and the wall and accumulate in groove 17.

Merely carrying bore 19 through the lower face of the piston will not insure removing all of the air from the piston. From a production point of view, it is desirable to have the drilling operations conducted normal to the plane of the face of the piston, but it should be understood that chamber 18 need not be axial but can be in any position as it is the greater density and/or viscosity of the oil compared to the gas that causes the ball to prevent oil flow but permit the passage of air.

It is to be understood that certain changes, alterations, modifications and substitutions can be made without departing from the spirit and scope of the appended claims.

We claim as our invention:

1. A self-bleeding piston for a hydraulic cylinder adapted to be mounted at an angle to the horizontal, which includes an annular pressure seal between the piston and the wall of the hydraulic cylinder, an annular groove in the periphery of the piston positioned between said fluid pressure seal and the lower face of the piston, a cylindrical chamber formed within said piston, the inlet end of which is in communication with said annular groove and the outlet end in communication with the upper face of the piston, a ball positioned within said cylindrical chamber of lesser diameter than said chamber, the ends of said chamber formed with seats on which said ball may seat to close the outlet therefrom upon flow of hydraulic fluid into said chamber.

2. In a hydraulic cylinder adapted to be mounted at an angle to the horizontal, a piston mounted to slide within said cylinder, a fluid pressure sealing means between the side wall of said piston and said cylinder, an annular groove in said piston side wall positioned between said sealing means and the lower face of said piston, a passage interconnecting said groove and the upper face of said piston, valve means in said passage to allow trapped air to flow therethrough but will close said passage to the flow of hydraulic fluid.

3. A self-bleeding piston for a hydraulic cylinder adapted to be mounted at an angle to the horizontal which includes an annular pressure seal in the periphery of the piston, between the piston and the wall of the hydraulic cylinder, an annular groove in the periphery of the piston positioned between said fluid pressure seal and the lower face of the piston, a cylindrical chamber formed within said piston, an inlet passage affording communication between one end of said chamber and said annular groove, and an outlet passage affording communication between the other end of said chamber and the upper face of the piston, a ball valve positioned within said cylindrical chamber of lesser diameter than said chamber, the ends of said passages in said chamber formed with seats on which said ball may seat to close the outlet upon flow of hydraulic fluid into said chamber.

4. A self-bleeding piston for a hydraulic cylinder adapted to be mounted at an angle to the horizontal which includes an annular pressure seal in the periphery of the piston between the piston and the wall of the hydraulic cylinder, an annular groove in the periphery of the piston positioned between said fluid pressure seal and the lower face of the piston, a chamber formed within said piston, the inlet end of which is in communication with said annular groove and the outlet end in communication with the other side of the piston, valve means within said chamber which remains open upon the passage of air therethrough but which closes the outlet therefrom upon flow of hydraulic fluid into said chamber.

EVERETT GRAVENHORST.
RAYMOND E. VAUGHN.

REFERENCES CITED

The following references are of record in the file of this patent:

UNITED STATES PATENTS

| Number | Name | Date |
| --- | --- | --- |
| 1,873,396 | Hallenbeck | Aug. 23, 1932 |
| 1,890,244 | Barrett | Dec. 6, 1932 |
| 2,240,039 | Hickman | Apr. 29, 1941 |
| 2,291,619 | Grant | Aug. 4, 1942 |